(12) United States Patent
Yager et al.

(10) Patent No.: US 7,362,661 B1
(45) Date of Patent: Apr. 22, 2008

(54) DEVICE FOR TEACHING TIME

(75) Inventors: Mark R. Yager, Ravenna, OH (US);
Michael K. Grasela, Newburgh Heights, OH (US)

(73) Assignee: K. & M. International, Inc., Twinsburg, OH (US)

( * ) Notice: Subject to any disclaimer, the term of this patent is extended or adjusted under 35 U.S.C. 154(b) by 134 days.

(21) Appl. No.: 11/370,636

(22) Filed: Mar. 7, 2006

Related U.S. Application Data

(60) Provisional application No. 60/659,254, filed on Mar. 7, 2005.

(51) Int. Cl.
*G04B 19/04* (2006.01)
(52) U.S. Cl. .................. 368/223; 368/228; 368/80
(58) Field of Classification Search ............ 368/223, 368/228, 80, 252, 253
See application file for complete search history.

(56) References Cited

U.S. PATENT DOCUMENTS

| | | | |
|---|---|---|---|
| 377,949 A | 2/1888 | Megill | |
| 4,531,841 A * | 7/1985 | Puff ........................ | 368/63 |
| 4,799,890 A * | 1/1989 | Thompson et al. ......... | 434/304 |
| 5,030,104 A * | 7/1991 | Caldwell .................. | 434/304 |
| 5,105,397 A * | 4/1992 | Whitney ................... | 368/80 |
| 6,795,376 B2 * | 9/2004 | Quine ...................... | 368/10 |
| 7,121,833 B2 * | 10/2006 | Brown et al. ............. | 434/304 |
| 2003/0210611 A1 * | 11/2003 | Bloch ....................... | 368/77 |
| 2005/0254351 A1 * | 11/2005 | Brown et al. .............. | 368/80 |
| 2006/0044945 A1 * | 3/2006 | Hopkins ................... | 368/228 |
| 2006/0209637 A1 * | 9/2006 | May et al. ................. | 368/223 |
| 2007/0070822 A1 * | 3/2007 | Booty et al. ............... | 368/223 |

OTHER PUBLICATIONS http://www.holcombscatalog.com/product_info.php?cPath=319_346&products_id=48571 "Talking Clever Clock", Holcomb's Education Resource Online Catalog, at least as early as Mar. 6, 2004.
http://www.holcombscatalog.com/product_info.php?cPath=319_346&products_id=48562, "The Primary Time Teacher™ Learning Clock", Holcomb's Education Resource Online Catalog, at least as early as Mar. 6, 2004.

* cited by examiner

*Primary Examiner*—Gary F. Paumen
(74) *Attorney, Agent, or Firm*—Pearne & Gordon LLP

(57) ABSTRACT

A device for teaching one about telling time is provided. The device includes a clock face with rotatable minute and hour hands. The minute and hour hands are adapted so that a user of the device can rotate them manually to indicate a preselected time. The device is able to detect the positions of the hands around the clock face, and to move the hands to indicate a predetermined time without any manual manipulation of the hands by the user. The device can be programmed with a variety of games that a user of the device can play to learn about telling time. The user can manually set the clock hands to indicate a time requested by the device and, if the time the user sets is incorrect, the device can automatically set the hands to the correct time.

20 Claims, 5 Drawing Sheets

FIG. 8
MINUTE CODES
| TIME | SW1 | SW2 | SW3 | SW3 |
|---|---|---|---|---|
| 0'CL. | 1 | 0 | 1 | 1 |
| 5 | 1 | 0 | 1 | 0 |
| 10 | 1 | 1 | 0 | 0 |
| 15 | 1 | 1 | 0 | 1 |
| 20 | 1 | 1 | 1 | 1 |
| 25 | 1 | 1 | 1 | 0 |
| 30 | 0 | 1 | 0 | 0 |
| 35 | 0 | 1 | 0 | 1 |
| 40 | 0 | 1 | 1 | 1 |
| 45 | 0 | 1 | 1 | 0 |
| 50 | 0 | 0 | 1 | 0 |
| 55 | 0 | 0 | 1 | 1 |
HOUR CODES
| TIME | SW1 | SW2 | SW3 | SW3 |
|---|---|---|---|---|
| 12 | 1 | 0 | 1 | 1 |
| 1 | 1 | 0 | 1 | 0 |
| 2 | 1 | 1 | 0 | 0 |
| 3 | 1 | 1 | 0 | 1 |
| 4 | 1 | 1 | 1 | 1 |
| 5 | 1 | 1 | 1 | 0 |
| 6 | 0 | 1 | 0 | 0 |
| 7 | 0 | 1 | 0 | 1 |
| 8 | 0 | 1 | 1 | 1 |
| 9 | 0 | 1 | 1 | 0 |
| 10 | 0 | 0 | 1 | 0 |
| 11 | 0 | 0 | 1 | 1 |
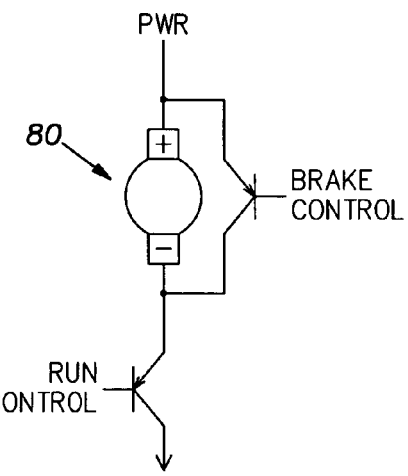
FIG. 9
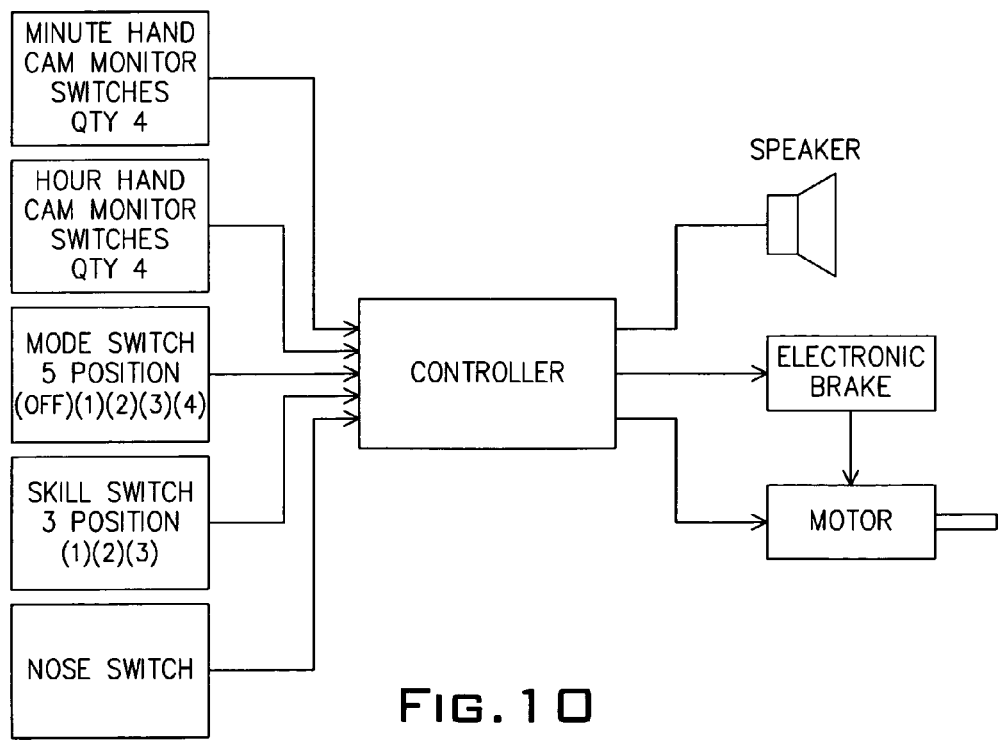
FIG. 10

DEVICE FOR TEACHING TIME

This application claims the benefit of U.S. provisional application Ser. No. 60/659,254 filed Mar. 7, 2005, the contents of which are incorporated herein by reference.

BACKGROUND OF THE INVENTION

The invention relates to a device for teaching time. More particularly, it relates to such a device in the form of a toy for children, making it enjoyable for children to learn how to tell time.

It is desirable to teach children how to tell time at a young age. It is particularly desirable that learning how to tell time is fun for the child so the lesson will hold the child's attention. Existing devices for teaching children about telling time include a clock face with hour and minute hands that are movable by the child. While some devices may instruct a child to set a particular time, either aurally or in writing, none will move the hour and minute hands autonomously to the correct time if the child has made a mistake. It would be advantageous to have a device that can instruct a child to set a particular time, and then set the hour and minute hands to that time on its own if the child makes a mistake. Such a device could not only instruct a child when he has made a mistake, but also show him how to set the time correctly.

SUMMARY OF THE INVENTION

An interactive device for teaching a user about telling time is provided. The device includes a clock face, a rotatable minute hand, a rotatable hour hand, a motor operatively coupled to the hands to rotate them around the clock face, and a controller for controlling the operation of the motor. The hands are adapted to be moved around the clock face manually by a user of the device. The controller is adapted to operate the motor to move the clock hands around the clock face to indicate a predetermined time without any manual manipulation of the hands by the user. The positions of the minute and hour hands around the clock face are detectable by the controller.

BRIEF DESCRIPTION OF THE DRAWINGS

FIG. 8 is table showing exemplary actuation combinations for switches SW1-SW4 and SW5-SW8, respectively, and the corresponding respective positions around the clock face of the minute and hour hands.

FIG. 9 is a simplified circuit diagram illustrating an electronic braking circuit for the motor that drives the minute and hour hands as hereinafter described.

FIG. 10 is a top level block diagram depicting the operation of a device for teaching time according to an embodiment of the invention.

DETAILED DESCRIPTION OF PREFERRED EMBODIMENTS OF THE INVENTION

Figure 1:
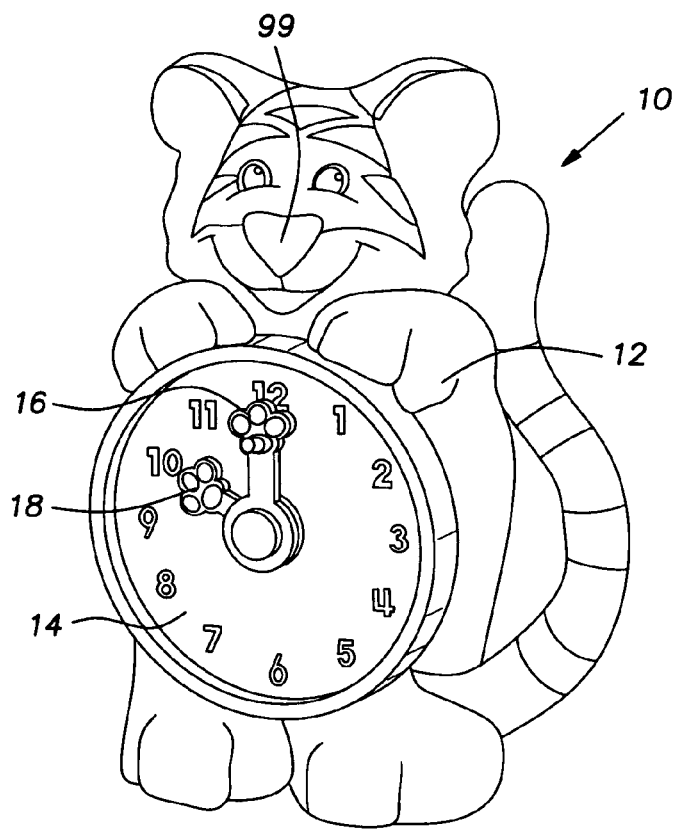
FIG. 1 shows an exemplary device in the form of a toy tiger holding a clock with hour and minute hands. The hands are both manually and automatically movable for teaching a child to tell time as further described herein.

A device 10 has a casing 12 defining an interior volume for housing gears and other mechanical and electronic components. The casing has an exterior portion that is visible to the user of the device 10. The casing can take any desirable or suitable form, so long as it includes a clock face 14. In the illustrated embodiment (FIG. 1), the casing 12 takes the form of a tiger holding a clock, which is appealing as a toy to a child. The clock face 14 is round and is graduated at each of the conventional 'hour' positions with an Arabic numeral from 1-12 as in a conventional clock. Alternatively, the clock face 14 need not be round, but can be any other suitable shape. Still further, the hour positions can be marked with other than Arabic numerals; for example Roman numerals or simply tick marks may be used. In a further alternative though less preferred embodiment, the hour positions need not be demarcated at all. This is less preferred because it will make it more difficult for a young child to learn to tell time with the device 10. In a further embodiment, tick marks can be provided on the clock face 14 to indicate individual 'minute' positions. For example, four tick marks provided between each adjacent pair of hour numerals can be provided in circumferential alignment to indicate a total of 60 minutes on the clock face. Numerals can be used in addition to or instead of tick marks to indicate minute positions on the clock face. As will become more evident below, the device 10 in the illustrated embodiment has been designed to teach children to tell time in the conventional five-minute increments, so individual minute positions between the hour-numerals have been omitted.

The clock face 14 is provided and is visible on an exterior portion of the casing 12. Minute and hour hands 16 and 18 are provided extending from the center of the clock face 14. The minute and hour hands 16 and 18 pivot from the center of the clock face (center line 2) so that the positions of the hands indicate a particular time as in a conventional clock. The positions of the hands can be manually adjusted by a child who is using the device 10, and they can be automatically adjusted to indicate a particular time as hereinafter described.

Figure 2B:
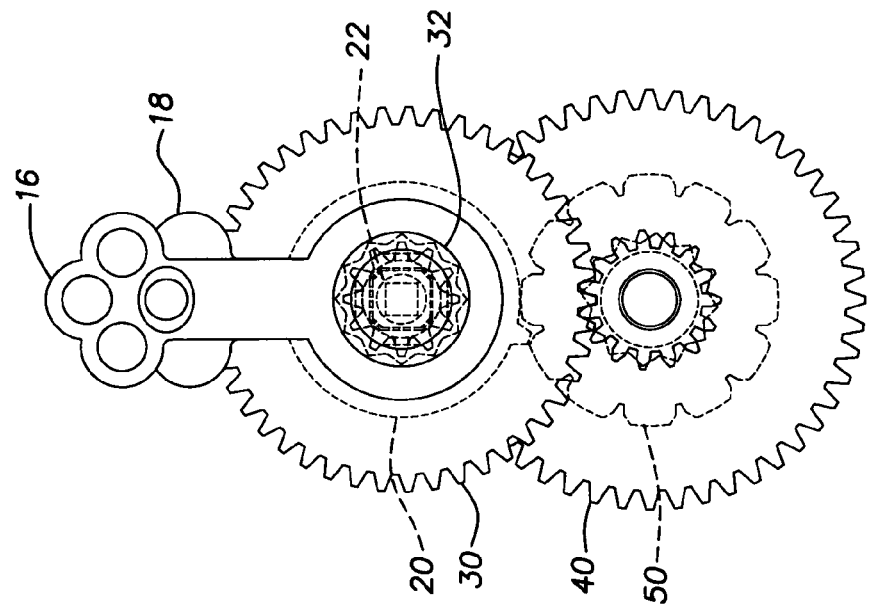
FIG. 2b is a front view of the device shown along arrow 2b in FIG. 2a, with the casing removed.
Figure 2A:
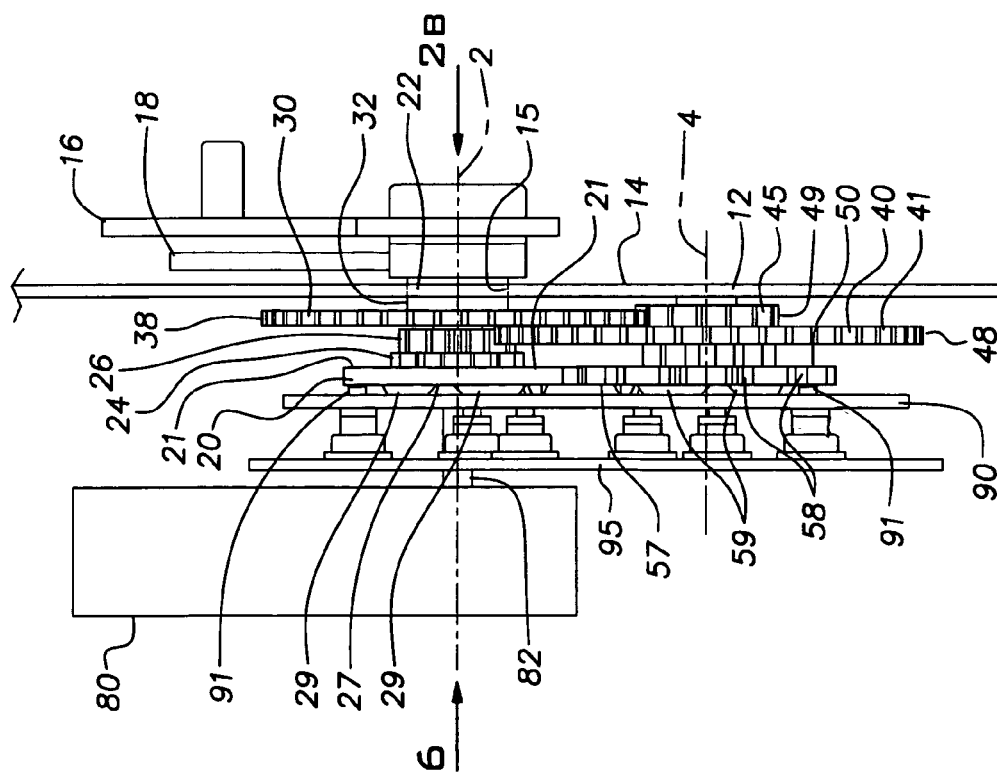
FIG. 2a is a side view of a device as herein described with the casing substantially removed to reveal certain mechanical components described below.
Figure 3:
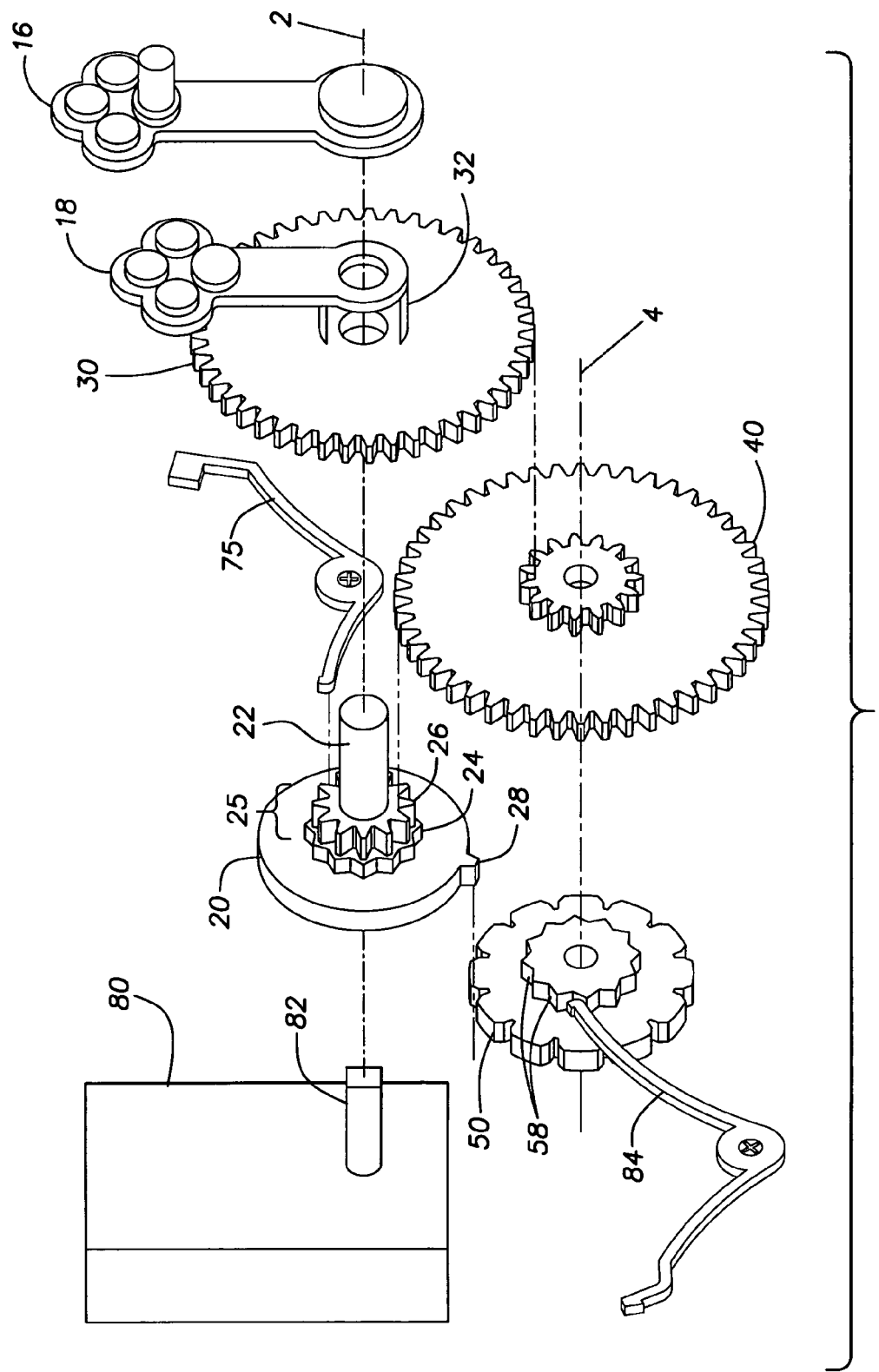
FIG. 3 is a centerline exploded view of the device shown in FIGS. 2a and 2b.

FIG. 2a is a side view of the device 10, with much of the casing 12 removed to reveal the components disposed therein. The portion of the casing 12 forming the clock face 14 has been retained in FIG. 2a. FIG. 2b is a front view of the device 10 shown along arrow 2b in FIG. 2a, with the casing 12 entirely removed. The structure and mechanical operation of the device will now be described.

The minute hand 16 and hour hand 18 are operatively linked to one another via a minute-hand cam 20, an hour-hand advance gear 30 and an hour hand gear 40 so that the hour hand is caused to advance 30° (corresponding to the radial distance between adjacent hour positions on the clock face) for every complete 360° revolution of the minute hand 16. In the illustrated embodiment, the minute hand 16 is fixedly linked via a minute-hand shaft 22 to the minute-hand cam 20, which is located within the casing 12 and aligned concentrically with the axis of rotation 2 of the minute hand 16. Thus, the minute hand 16 and cam 20 rotate in a 1:1 ratio about the same axis 2. The hour-hand gear 30 is disposed within the casing 12 between the minute-hand cam 20 and the clock face 14, also aligned concentrically with respect to the axis 2. The hour-hand gear 30 is fixedly linked to the hour hand 18 via hour hand sleeve 32, so that the hour hand 18 and the gear 30 rotate in a 1:1 ratio about the same axis 2. The minute-hand shaft 22 extends from the minute-hand cam 20 through the hour-hand gear 30 and sleeve 32 to the minute hand 16 on the outside of the casing 12. Both the shaft 22 and sleeve 32 extend (concentrically) through an opening in the casing 12 at the center of the clock face 14.

Figure 4:
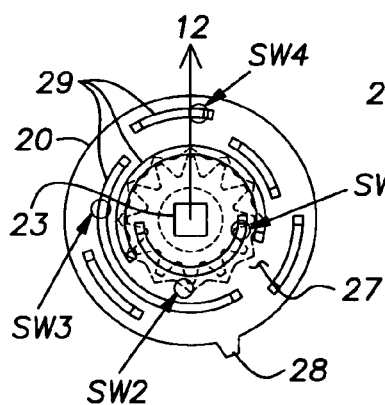
FIG. 4 is a plan view of the minute-hand cam 20 of the device shown in FIGS. 2a and 2b.
Figure 4A:
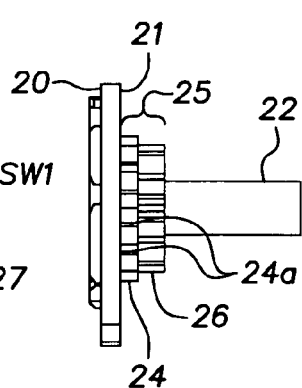
FIG. 4a is a side view of the minute-hand cam 20 of FIG. 4.

As best seen in conjunction with FIGS. 2a and 4a, the minute-hand cam 20 has a cam hub 25 extending from the surface 21 of the cam 20 that faces the clock face 14. The cam hub 25 includes at least a sprocket portion 26 having teeth provided about its circumference. In the embodiment illustrated in the figures, the cam hub 25 also includes a detent receiver portion 24 located proximate the adjacent surface of the cam 20, with the sprocket portion 26 located more distally from that surface. The function of the optional detent receiver portion 24 is discussed below in conjunction with a preferred embodiment of the device 10.

An hour-hand advance gear 40 is also disposed within the casing 12, concentric with a central axis 4 that is offset from and parallel to the axis 2. The hour-hand advance gear 40 has teeth 48 disposed about its circumference, which are dimensioned to cooperatively engage the teeth on the sprocket portion 26 of the minute-hand cam 20. The hour-hand advance gear 40 also has a sprocket hub 45 extending from the surface 41 of the gear 40 that faces the clock face 14. The sprocket hub 45 has a set of teeth 49 disposed about its circumference for cooperative engagement with the hour-hand gear 30. Specifically, the hour-hand advance gear 40 is positioned and dimensioned so that its teeth 48 cooperatively engage the teeth on sprocket portion 26 of the minute-hand cam 20, and simultaneously the teeth 49 on the sprocket hub 45 cooperatively engage the teeth 38 about the circumference of the hour-hand gear 30. The relative diameters of the sprocket portion 26 of the minute-hand cam 20, the hour-hand advance gear 40, its sprocket hub 45 and the hour-hand gear 30, including the dimensions and number of the teeth provided on each, are selected so that for every complete 360° rotation of the minute hand 16 (fixedly linked to the minute-hand cam 20), the hour hand 18 (fixedly linked to the hour-hand gear 30) is caused to rotate 30° in the same direction as known in the art; i.e. a 1:12 hour hand:minute hand revolution ratio. Appropriate diameters or diameter ratios, as well as appropriate dimensions and numbers of teeth, for each of the aforementioned gears/cam are known or conventional in the art to produce this ratio, or otherwise can be determined by one having ordinary skill in the art without undue experimentation. Accordingly, their respective diameters (or diameter ratios) and the dimensions and numbers of their teeth will not be further described.

It will be understood the foregoing structure to fix the ratio of minute hand to hour hand revolutions is exemplary. Other gear arrangements and structures including different numbers of gears having different structures can be used to fix the hour hand:minute hand revolution ratio. The precise gear arrangement used for this purpose is not critical to the invention. All that is important with respect to the structure thus far described is that the minute-hand cam 20 be fixedly coupled to the minute hand 16 so the two rotate in a 1:1 relationship (preferred), or otherwise that the minute-hand cam 20 be operatively linked to the minute hand 16 so the two rotate according to some other well defined and fixed ratio.

The device also includes a control system. The control system can detect the positions of the minute and hour hands 16 and 18, and it can adjust their positions to indicate a preselected time without any manual manipulation of them by a user, such as a child. Detection of the hand positions is described first.

As already discussed, the minute-hand cam 20 rotates in a 1:1 or other known, fixed ratio with respect to the minute hand 16. By detecting the angular (rotational) position of the minute-hand cam 20, one also knows the position of the minute hand 16 based on its fixed rotational relationship to the cam 20. In the illustrated embodiment, the minute-hand cam 20 has one tooth 28 extending radially from the circumference thereof. An hour-hand cam 50 having a series of receiver slots 58 spaced periodically at regular intervals about its circumference is also provided. The hour-hand cam 50 is positioned, and the receiver slots 58 are dimensioned, so that on each complete 360° revolution of the minute-hand cam 20, the tooth 28 engages the next successive receiver slot 58, causing the hour-hand cam 50 to rotate a predetermined angular distance. In a preferred embodiment, the hour-hand cam 50 is of approximately the same diameter as the minute-hand cam 20, and has a series of twelve (12) receiver slots 58 spaced at regular 30° intervals about its circumference. In this arrangement, on each complete revolution of the minute-hand cam 20, the tooth 28 will engage the next successive receiver slot 58 and cause the hour-hand cam 50 to rotate about 30°. This will produce one complete revolution of the hour-hand cam 50 for every twelve revolutions of the minute-hand cam 20, which is the same ratio for the hour- and minute-hands 18 and 16.

Figure 6:
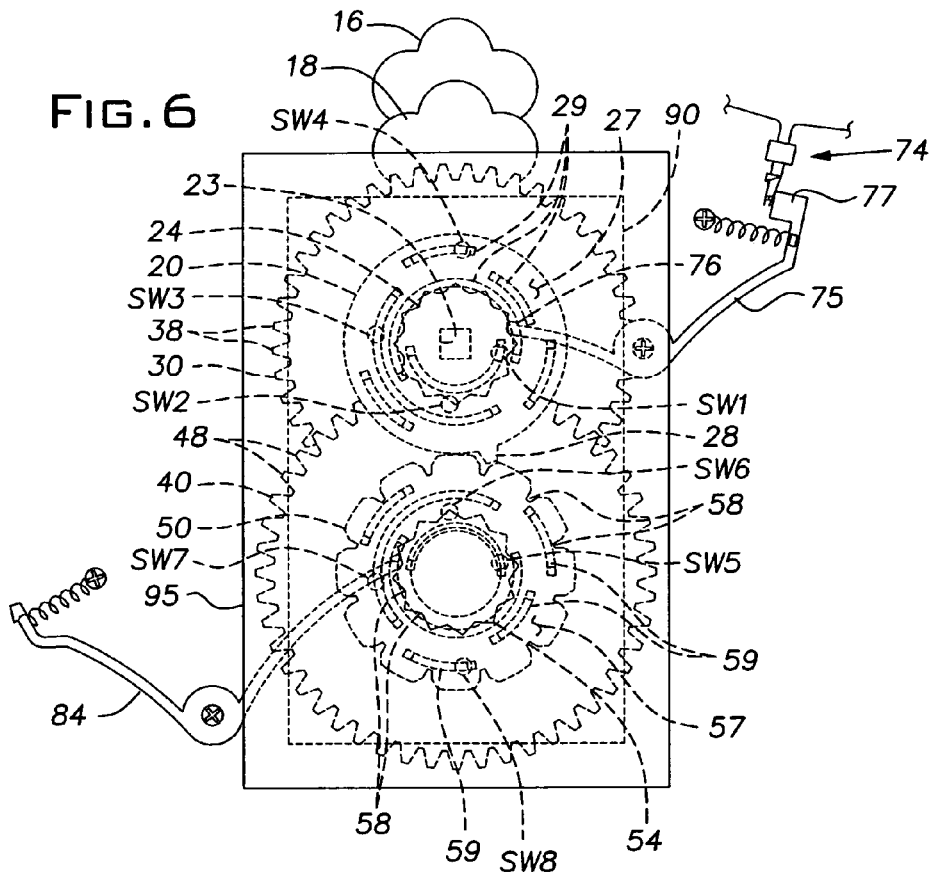
FIG. 6 is a rear view of the device shown along arrow 6 in FIG. 2a, with the motor assembly and hour and minute hands removed.

An hour detent member 84 is provided to retain the hour-hand cam 50 in each discrete angular position (corresponding to respective hour positions for the hour hand 18 on the clock face 14) between successive complete revolutions of the minute-hand cam 20. As seen in FIG. 6, the hour detent member 84 is biased for engagement in successive detent notches 58 provided about the circumference of a detent hub on the hour-hand cam 50. Each such notch 58 corresponds to one discrete position of the cam 50 it is desired to detect, and the notches 58 are aligned so that the cam 50 can be retained in those respective positions through engagement by the detent member 84. With each revolution of the minute-hand cam 20, the tooth 28 forces the hour-hand cam 50 to rotate as described above, overcoming the biasing force of the detent member 84 in the then-current detent notch 58. The detent notches 58 are spaced circumferentially about the detent hub on the cam 50 at intervals corresponding to the degree of rotation imparted to the cam 50 with each revolution of the minute-hand cam 20. This way, the detent member 84 engages in the next-successive detent notch 58, thereby fixing the angular position of the cam 50, synchronously with each discrete angular advancement of the cam 50. The cam 50 is then retained in its newly indexed angular position until the next complete revolution of the minute-hand cam 20 forces a successive discrete rotation (indexing) of the cam 50, and so on.

In the described embodiment, unlike the minute-hand cam 20 and the minute hand 16, the hour-hand cam 50 and the hour hand 18 are not mechanically linked to one another.

Therefore, there is no fixed relationship provided between these two members, meaning the angular position of one does not necessarily indicate the angular position of the other. However, if one knows the initial angular positions of both the hour-hand cam 50 and the hour hand 18, then the position of the hour hand 18 can be inferred from that of the cam 50 based on 1) the fixed revolution ratio between the minute-hand cam 20 and the minute hand 16, and 2) the known revolution ratio between the two cams 20 and 50. When the revolution ratio between the cam 20 and the minute hand 16 is 1:1, one complete revolution of the cam 50 per twelve revolutions of the cam 20 means that one revolution of the cam 50 corresponds to one revolution of the hour hand 18. It will therefore be recognized that in the present embodiment the ratio of revolutions between the hour-hand cam 50 and the hour hand 18 has been fixed at 1:1, even though they are not mechanically linked.

The remaining description of the control system is provided assuming the above-described embodiment, wherein the ratio of revolutions of cam 50 to hour hand 18 is 1:1, and that of cam 20 to minute hand 16 is 1:1. However, as already described these ratios need not be the same nor 1:1, so long as the ratios are fixed and known. Other ratios can be selected and used based on cams 20 and 50 of various diameters, different periodic spacing of the receiver slots 58, the arrangement of gears employed, etc. as will be readily recognized by persons of ordinary skill in the art. Alternatively, these ratios may be made variable (e.g. using non-circular cams or gears) so long as their variance follows a known relation. This embodiment is less preferred, however, because it will unnecessarily complicate the mechanical components of the device 10.

The control system includes a controller such as a microprocessor 70 that monitors the angular (rotational) positions of both the minute-hand cam 20 and the hour-hand cam 50 through a series of sensors or indicator switches that are actuated by each cam as it rotates. By monitoring the angular position of the two cams 20 and 50, the microprocessor 70 correspondingly monitors the positions of the minute and hour hands 16 and 18. The positions of the cams 20 and 50 can be monitored through a series of cam switches provided in conjunction with each of the cams 20 and 50. For example, a series of simple on/off switches can be actuated in different combinations corresponding to different angular positions for each cam. The microprocessor can detect the cam's position based on the combination of signals it receives from the associated switches at a particular moment. The number of on/off switches associated with each cam will depend on the number of discrete angular positions in which it is desired to detect that cam.

According to an embodiment of the invention, it is desirable to detect twelve discrete positions of each of the minute-hand and hour-hand cams 20 and 50. Based on a 1:1 cam-to-hand ratios for both the hour- and minute-hands, this corresponds to the microprocessor being able to determine the time visible on the clock face 14 in five-minute increments—12 hour-hand positions, one for each hour, and 12 minute-hand positions, one for every five-minute increment of time (60 minutes on the clock face divided by twelve minute-hand positions). A desirable structure for detecting twelve positions of each of cams 20 and 50 will now be described.

Figure 5:
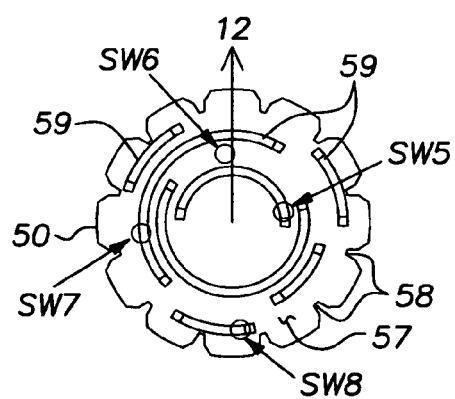
FIG. 5 is a plan view of the hour-hand cam 50 of the device shown in FIGS. 2a and 2b.

Referring first to FIGS. 4 and 5, each of the cams 20 and 50 is provided with a series of arcuate lobes 29 and 59, respectively. The lobes 29 and 59 are provided on respective switching surfaces 27 and 57 of the cams 20 and 50, which face opposite the clock face 14 (see FIG. 2a). Each arcuate lobe 29,59 projects axially (sticks out) from the respective surface 27 or 57, and extends along a circular arc defining an orbital path that is concentric with the central axis of the respective cam 20 or 50. A series of push-button type switches are provided overlying and adjacent the switching surfaces 27 and 57 of each of the cams 20 and 50. The number of switches associated with (overlying) each cam corresponds to the number of discrete orbital paths in which lobes 29,59 are provided. One switch is aligned with each orbital path, in a fixed position so that the switch is actuated when contacted by a lobe 29,59 as the cam 20,50 rotates. Because each lobes is an arc and not a complete circle, the associated switch will be actuated for a portion of the cam's revolution, but not all of it.

In FIGS. 4 and 5, there are four orbital paths on each cam for the lobes 29,59. Also illustrated schematically in these figures are four switch positions, namely for switches SW1-SW4 associated with the minute-hand cam 20, and SW5-SW8 associated with the hour-hand cam 50. One switch is provided in each orbital path for the lobes 29,59. The pattern of lobes 29,59 is selected so that a different combination of the switches will be actuated through contact with lobes 29,59 for each discrete angular position of the cam 20,50 it is desired to detect. For example, in FIG. 4 the minute-hand cam 20 is shown with a radial arrow indicating the 12-o'clock position. The illustrated position thus corresponds to the minute-hand pointing toward the numeral "12" on the clock face 14. Based on the positions of switches SW1-SW4 and of the lobes 29 in the 12-o'clock position, the switches will be actuated (pushed) based on the following combination:

SW1: ON
SW2: OFF
SW3: ON
SW4: ON

Likewise, for the 12-o'clock position of the hour-hand cam 50, illustrated in FIG. 5, the associated switches SW5-SW8 will be actuated (pushed) based on the following combination:

SW5: ON
SW6: OFF
SW7: ON
SW8: ON

Accordingly, it will be appreciated that when actuated according to the above sequence, switches SW1-SW8 will indicate to the microprocessor that the minute and hour hands 16 and 18 are positioned to indicate a time of 12-o'clock. It will further be recognized that as each of the cams 20 and 50 rotates, different actuation combinations of the respective switch groups SW1-SW4 and SW5-SW8 will indicate different minute- and hour-hand positions, corresponding to different times indicated by those hands. The push-button switches can be provided as follows.

A plate 90 is mounted behind the cams 20 and 50 so that its front surface is substantially tangent to the outermost surfaces of the lobes 29,59 as seen in FIG. 2a. A circuit board 95 is mounted behind the plate 90, opposite the cams 20 and 50. A series of contact terminals for each switch, SW1-SW8, are located on the surface of the circuit board 95 facing the plate 90, in positions that correspond to the respective orbital paths for the lobes 29,59 on each cam 20 and 50. The terminals are provided as pairs of exposed and adjacent, but not touching, metallic terminals (not shown) on the surface of the circuit board 95. A series of actuator pins 91 are provided extending through similarly dimensioned holes in the plate 90 at locations substantially in register with the associated pairs of adjacent metallic terminals on the circuit board 95. A series of contact plungers 96 as known in the art are provided on the surface of the circuit board 95, overlying each pair of adjacent metallic terminals for each switch, SW1-SW8. The contact plungers 96 include a conductive element on an interior surface thereof so that when pressed against the circuit board 95, it closes the circuit between the adjacent terminals for the associated switch, turning the switch "ON." The plungers typically are made from a resilient elastomeric material with the conductive element normally biased away from the metallic terminals; meaning the switch is normally "OFF."

The lobes 29,59 have beveled leading edges (at least based on a clockwise direction of rotation for each cam). When each lobe 29,59 rotates into the position of the associated switch, it pushes the pin 91 located in its orbital path toward the contact plunger 96 behind it. This in turn causes the conductive element of the plunger 96 to contact the underlying adjacent terminals thereby closing the circuit and sending an electrical signal to the microprocessor for that switch. Once the lobe 29,59 passes the position of the pin 91 along its orbital path, the outward bias of the plunger 96 forces the conductive element out of contact with the terminals, breaking the circuit for that switch and pushing the pin 91 back through the plate 90. In FIG. 2a, some of the switches are shown in an actuated or "ON" position (where the lobes 29,59 have pressed the associated pins 91 through the plate 90, thereby pressing the corresponding plungers 96 and closing the switch), whereas other switches are shown in an "OFF" position.

It should be clear that the particular pattern of lobes in the orbital paths for the cams 20 and 50 as shown in FIGS. 4 and 5 can be varied and need not be exactly as illustrated. The specific patterns illustrated in those figures are desirable when the cam-to-hand ratio for both cams 20 and 50 is 1:1, and it is desired to monitor the time indicated by minute and hour hands 16 and 18 in five-minute increments. For the lobe patterns illustrated in FIGS. 4 and 5 and assuming 1:1 cam-to-hand ratios for both cams 20 and 50, the tables in FIG. 8 show the switch actuation combinations for each discrete position of the minute and hour hands that is to be detected by the microprocessor.

It will be appreciated that the precise switching/position detecting structure described above need not be used. Other types of switches, and switching structures are known for determining the angular position of a rotating member, and could be used and implemented by a person of ordinary skill in the art without undue experimentation. For example, arcuate metallic tracing pads could be used on the switching surfaces of the cams to complete circuits of orbitally aligned and overlying switch terminals. In a further alternative, differently constituted push-button type switches, or ones that are normally "ON" instead of normally "OFF," could be used. In a still further alternative, circumferentially oriented switches could be positioned about the edges of each cam to detect the angular position of each. Still further, optical type detection systems could be used, wherein an optical detector monitors the angular position of an optical marker on each cam. In a less preferred alternative, analog or mechanical detection mechanisms also could be used.

When ON/OFF (digital) push-button type switches are used to detect the angular position of each cam, the number of switches necessary will depend on the number of discrete angular positions it is desired to detect. In the illustrated embodiment, it is desired to detect each cam 20,50 in twelve discrete positions. Therefore, a minimum of four switches are required because only three switches would provide a maximum of eight sequence combinations ($2^3$), whereas four switches provides 16 possible combinations ($2^4$). If more than 16 discrete positions are to be detected, then more switches would be necessary.

Figure 7:
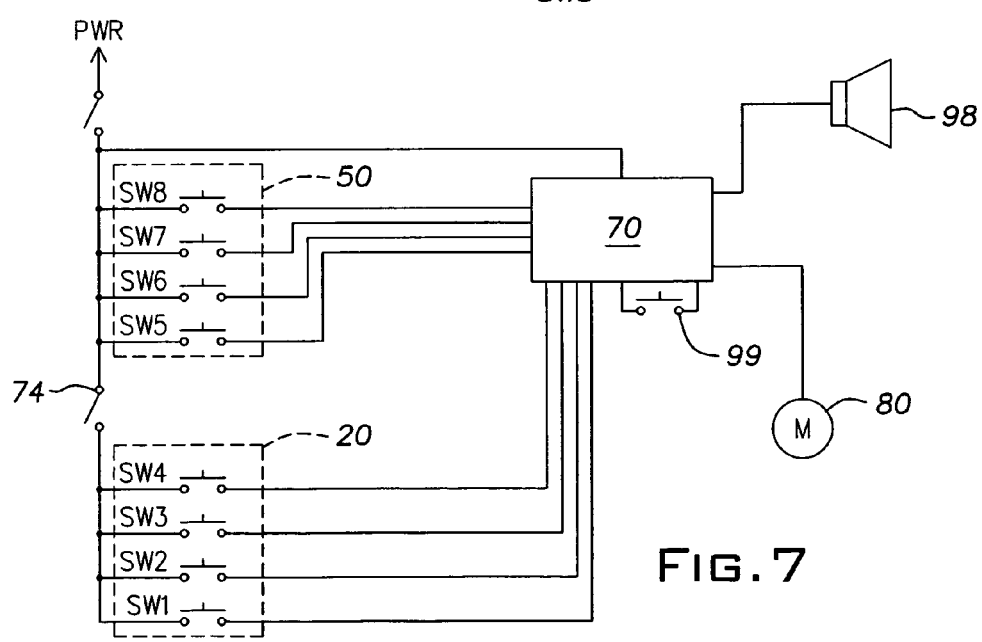
FIG. 7 is a simplified circuit diagram illustrating the electronic control architecture of an embodiment of the device.

FIG. 7 shows a simplified circuit diagram of a control system employing four ON/OFF switches to detect the position of each cam 20 and 50 as above described. Switches SW1-SW4 are shown associated with the minute-hand cam 20, depicted schematically in FIG. 7, whereas switches SW5-SW8 are shown associated with the hour-hand cam 50, also shown schematically. One terminal of each switch is connected to a common power source with the microprocessor 70, while the other terminal is connected to the microprocessor. When each switch is closed, the microprocessor 70 receives an electrical signal corresponding to that switch. The combination of signals for the group of switches SW1-SW4 or SW5-SW8 at any given moment indicates to the microprocessor the position of the associated cam 20 or 50, respectively. Correspondingly, based on the ratios of revolution between each cam 20,50 and its respective clock hand 16,18, their revolution ratios with respect to one another if appropriate and the initial position of each cam 20,50 (corresponding to a 12-o'clock position for the respective minute or hour hand 16 or 18), the microprocessor 70 can determine the real-time position of the clock hands 16 and 18 at any moment.

The controller (microprocessor 80) is electrically connected to a motor 80. The motor 80 has a drive shaft 82 mechanically coupled to the hands of the clock. When the revolution ratio between the minute hand 16 and the hour hand 18 is mechanically fixed through a series of gears, rotation of the minute hand 16 will result in a corresponding rotation of the hour hand 18 according to the fixed ratio. Therefore, the drive shaft 82 is engaged and operatively received in keyway 23 at the center of the minute-hand cam 20, so that rotation of the drive shaft 82 results in corresponding rotation of the minute-hand cam 20. This in turn causes rotation of the minute hand 16 to which it is fixedly linked, and also of the hour hand 18 to which it is linked via the hour-hand advance gear 30 and hour-hand gear 40. The microprocessor 70 thus can actuate the motor 80 to rotate the clock hands until a desired time is displayed on the clock face 14, and it can monitor the position of those hands in real time based on the signals it receives from the switches SW1-SW8. The drive shaft 82 need not be directly connected to the motor's rotor or rotating armature. For example, the drive shaft 82 can be provided as part of or extending from a gear whose rotation is actuated either directly or indirectly via operation of the motor, for example via one or a number of intermediate and cooperating gears as known in the art.

To initiate rotation of the clock hands 16 and 18, the microprocessor 70 supplies an appropriate voltage (preferably PWM controlled) to the motor 80 and monitors the signals from switches SW1-SW8. It slowly accelerates the motor (preferably via increasing the pulse width when PWM control is used) until the rate rotation for the minute-hand cam 20 (as determined by the rate of change of control signals from the switches SW1-SW4) reaches a predetermined value or RPM. The predetermined rotation rate is maintained, preferably until the minute hand 16 reaches a position that is 5 minutes (on the clock face 14) before the position where the hands need to stop. At that point the microcontroller reduces the effective motor voltage (preferably through reducing the pulse width voltage to the motor) to slow the hands. When the correct hand position is reached, or shortly before, the microprocessor turns off the motor voltage so the motor, and the hands, will come to a stop. If batteries are used to power the device 10, as they get weaker the hand movement rate can be maintained relatively constant by monitoring the rate of change period for the switches SW1-SW4 and adjusting the effective motor voltage through modulation of the voltage pulse widths via PWM control. The pulse rate can be selected by one of ordinarily skill in the art based on such factors as the speed of the microprocessor, the rate at which it is desired to change the pulse width, the desired speed for the motor 80 etc. A PWM frequency of 120 Hz has been found to produce suitable operation. Pulse width modulation (PWM) control of the motor 80 is desirable because it makes efficient use of energy to operate the motor, which is desirable because in preferred embodiments the device can be battery operated.

In a preferred embodiment, an electronic braking circuit can be incorporated to stop the motor's rotation, and consequently that of the clock hands, when the hands 16 and 18 reach a precise position. When an electronic braking circuit is employed, in addition to shutting off the motor voltage, a temporary short circuit, or shunt, is applied between the opposite terminals of the motor 80, effectively converting the motor into a generator. As the motor's armature (not shown) continues to rotate after the voltage has been removed (as the armature coasts to a stop), the temporary short circuit causes the current generated by the armature's continued rotation past the permanent magnets to induce magnet fields that oppose the permanent magnetic fields around the permanent magnets. Consequently, the armature is quickly slowed to a halt on application of the short circuit, or shunt, between the motor's terminals. An exemplary electronic braking circuit is illustrated schematically in FIG. 9. In this exemplary embodiment, the microprocessor 70 is operatively connected to the RUN CONTROL and BRAKE CONTROL transistors. In "RUN" mode (when the motor is running), the microprocessor activates (i.e. turns on) the RUN CONTROL transistor so a complete circuit is provided from power, through the motor to ground, and deactivates (i.e. turns off) the BRAKE CONTROL transistor so there is no short circuit between the opposite terminals of the motor 80. Conversely, in "BRAKE" mode, the RUN CONTROL and BRAKE CONTROL transistors are turned off and on, respectively, so that the motor is no longer connected to ground, and there is a short circuit between the opposite terminals of the motor. It will be appreciated that the RUN CONTROL and BRAKE CONTROL transistors illustrated in FIG. 9 and described here are exemplary, and that other known or conventional structures or circuits, such as relays, could be implemented by persons of ordinary skill in the art to achieve the results described.

The control system also can include an operator-actuated switch 99 to receive input from the user of the device 10. In the illustrated embodiment, the switch 99 is provided behind the nose of the tiger (FIG. 1), and is actuated by pressing the tiger's nose. An output device also can be provided, for example a speaker 98 as shown, so the microprocessor can send messages (e.g. audio) to the user as part of an interactive game for teaching time as will be more fully described. A memory can be provided in conjunction with the microprocessor 70 for storing pre-recorded messages that can be played based on or to request user inputs as part of a game for teaching the user about telling time as further described below.

In a preferred embodiment, the minute-hand cam 20 includes a detent receiver portion 24 as shown in FIGS. 2a and 4a and mentioned above. The detent receiver portion 24 has a series of detent notches or grooves 24a located about its circumference. The number of detent notches 24a corresponds to the number of discrete positions in which it is desired to detect the minute-hand cam 20. A minute detent member 75 having a detent engagement portion 76 and an interval switch actuator portion 77 is provided. The minute detent member 75 is similar to the hour detent member 84, and is biased so that on rotation of the minute-hand cam 20 the engagement portion 76 is biased into engagement with a detent notch 24a at intervals where detent notches 24a are provided about the detent receiver portion 24. More specifically, the engagement portion 76 is engaged with a detent notch 24a in each discrete angular position of the cam 20 it is desired for the microprocessor 70 to detect. A minute interval switch 74 is provided adjacent the switch actuator portion 77. The minute interval switch 74 is normally open, and is provided in the circuit pathway between the switches SW1-SW4 and the microprocessor 70 (illustrated in FIG. 7) so that the microprocessor 70 cannot detect a signal from any of switches SW1-SW4 unless the interval switch 74 is closed. The interval switch 74 can be in the form of a leaf switch as shown in FIG. 6, where two conductive terminals are provided as metallic flaps that are normally separated (open circuit), but which can be brought into reversible contact by pressing one terminal into the other. In FIG. 6, the terminals are brought into contact when the switch actuator portion 77 of the detent member 75 presses against the adjacent leaf contact, bending it into and causing it to contact the other. The detent member 75 and interval switch 74 are designed so that when the engagement portion 76 is received in a detent notch 24a on the detent receiver portion 24 of the minute-hand cam 20, the actuator portion 77 operates the interval switch 74 to close the circuit.

Thus, the microprocessor 70 will only receive a signal from switches SW1-SW4 when the minute-hand cam 20 is in one of the discrete angular positions in which its position is to be detected. This architecture has proven useful to minimize or eliminate signal noise in switches SW1-SW4 based on angular positions of the minute-hand cam 20 where the end of one lobe 29 or the beginning of another may be in contact with the associated pin(s) 91, producing errant signals. Advantageously, the lobes 29 of the minute-hand cam 20 are patterned so that for each discrete angular position (e.g. each 5-minute interval) where detection is desired, the transient portions of the lobes (leading/trailing edges) are not in the vicinity of the associated pins 91. Consequently, in these discrete positions each switch is clearly "ON" or "OFF." By limiting detection of signals from switches SW1-SW4 to only those moments when the minute hand 16 is in a discrete 5-minute interval position, and consequently when the minute interval switch 74 is closed, errant minute hand signals are avoided. The microprocessor 70 can be programmed to employ the last-read value for the minute-hand cam position as the current value until the next value is obtained. For example, the microprocessor may consider 1:37 to be 1:35 because the last minute hand signal was for a time of 1:35, and the next one will not be received until 1:40.

A similar interval switch mechanism can be employed for the hour-hand cam 50 if desired. However, in the present embodiment where the hour-hand cam 50 actuated exclusively by each complete revolution of the minute-hand cam 20, and is not directly mechanically coupled to the hour hand 18, the hour-hand cam 50 is rotated discretely as described above, and analog rotation of the hour-hand cam 50 is not necessary. Because the hour-hand cam 50 is rotated discretely into fixed positions, no conditioning is required to eliminated transient signals from switches SW5-SW8. Alternatively, in embodiments where the hour-hand cam 50 does rotate continuously, a similar interval switch as described above may be desirable to eliminate transient signals from switches SW5-SW8.

Optionally, the device can include numerous modes corresponding, e.g., to different games the microprocessor is programmed to play or facilitate in order to teach the user about telling time. The device also can include numerous skill levels. Exemplary operation of the device 10 will now be described in some detail for a device including four different user-selectable modes (games) and three user-selectable skill level settings. The device 10 can be provided with appropriate switches for the selection of a particular skill level, mode, etc., and the microprocessor 70 can be programmed to perform different functions, and to play or implement different games at different levels of difficulty based on user-selected settings.

For example, the microprocessor 70 can be programmed so that the following functions may be performed, including articulation of the following or other phrases using a prerecorded or computer-generated voice.

When the mode switch is set to Mode 1, the device can say "Move my hands to any position. Then press my nose. I'll tell you what time I'm set for." The child then sets the hands to any position and presses nose to actuate the switch 99. The device can then say "You set the clock to show 12:20 or twenty after twelve." Or it can say "You set the clock to show 1:40 or twenty to two."

When the device is set for Mode 2, the device can say "I'll set my hands and you guess what time it is." The device 10 then rotates the hands of the clock to a preselected time. Then the device says "What time do you think it is?" After a "thinking" period, the device will tell the child what time it is, for example, "If you said 1:20, you're right. To try another, press my nose." If the child presses nose again (actuating switch 99), the process is repeated.

If the device is set to Mode 3, the device can say "Move my hands to show the time I ask for. When you finish moving my hands, press my nose. See if you can move my hands to show 3:15 or a quarter after three." After the child moves the hands, the switch 99 is then pressed as instructed. If the hands are set incorrectly, the device can say, for example, "You set the clock to show 3:30. Here's how you would set the clock to show 3:15." The device will then move the hands, automatically, to show how the clock should have been set. The device can then say "To try another, press my nose." As another example, the device in Mode 3 can say "See if you can move my hands to show 10:30 or half-past ten." If the hands are set correctly, the device can respond "Fantastic" or "Super job", followed by "To try another, press my nose."

If the device is set to Mode 4, the device can say "Let's play teaching time tales. Listen to my story and then move my hands to show the time I'm looking for. When you finish moving my hands, press my nose." The device then says a little story, such as "We're going to a picnic. The picnic will be at 4 o'clock. Move my hands to show 4 o'clock. Then press my nose." After the child moves the hands and presses the nose, if the hands are set incorrectly, the device can say "You set the clock to show 8:30 or half-past eight. Here's how you would set the clock to show 4 o'clock." The device then moves the hands, automatically, to show how the clock should have been set. The device then says "To try another, press my nose." If the child had set the hands correctly, the device says "Fantastic" or "Super job", followed by "To try another, press my nose." At Levels 2 and 3 of Mode 4, the device can say "Soccer practice usually starts at 4:15 or a quarter after four [at this point in the story, the device automatically moves the hands to 4:15] but today it's going to be 15 minutes later. What time will that be? Move my hands to show the new time. Then press my nose." After the child moves the hands and presses the nose, if the hands are set incorrectly, the device can say "You set the clock to show 4:25 or twenty five past four. The correct answer is 4:30 or half past four. Here's how you would set the clock to show 4:30." The device then moves the hands, automatically, to show how the clock should have been set. The device then says "To try another, press my nose."

One of the features of the invention is that the device has the ability to move the minute and hour hands 16 and 18 by itself, through the use of the microprocessor 70 monitoring the position of the hands and controlling the drive motor voltage and electronic brake. This permits the device to correct the child and to set up story problems. When the child moves the minute and hour hands 16 and 18, the device can sense and identify the position the child has left the hands in. Also, the time is not only vocalized in digital time (example 10:15="ten fifteen") but also in analog time (for example, 10:15="quarter after ten"). In addition, the device is switchable into different skill levels, e.g. levels 1, 2 and 3 that relate to the three different levels taught in school in kindergarten, first grade, and second grade. For example, level 1=kindergarten=hour and half-hour; level 2=first grade=hour, half-hour and quarter-hour; level 3=second grade=hour, half-hour, quarter-hour and five-minute increments.

In the illustrated embodiment the device has the appearance of a tiger. But the exterior appearance of the device may be any other animal (elephant, giraffe, lion, alligator, dog, cat, parrot etc.) or non-animal or any other shape or appearance, preferably which is appealing to children.

FIG. 10 shows a top level diagram illustrating, schematically, the operational architecture of a device 10 as described herein, including a mode switch that is user-selectable from among four different modes and a skill level switch that is user selectable from among three different skill levels, such as described immediately above.

From the foregoing, it will be seen the device 10 is an interactive device for teaching its user about telling time. Preferably, it is interactive not only in the sense that it can provide feedback indicating whether a user has set the time correctly in response to a request, but it can also set the clock hands automatically, without any manual manipulation by the user, to show the correctly set time if the user makes a mistake. This way, a user is not simply told (e.g. in words) that he made a mistake, but the device actually moves the hands to show him how they should have been set to indicate the correct time. This is believed to be a more effective way to learn how to tell time because the user is not simply told, but he is shown how to set the correct time if he makes a mistake. In other words, the device preferably is capable to respond interactively to a mistaken time set by the user, by moving the minute and hour hands around the clock face automatically to set the correct time.

Although the invention has been described with respect to certain embodiments, it will be understood the invention is not to be correspondingly limited to those embodiments, and that various modifications or changes can be made thereto without departing from the spirit and scope of the invention as set forth in the appended claims.

What is claimed is:

1. An interactive device for teaching a user about telling time, the device comprising a clock face, a rotatable minute hand, a rotatable hour hand, a motor operatively coupled to said hands for rotation thereof around the clock face, and a controller for controlling the operation of said motor, the hands being adapted to be moved around said clock face manually by a user of the device, said controller being adapted to operate said motor to move the clock hands around said clock face to indicate a predetermined time without any manual manipulation of the hands by said user, the positions of said minute and hour hands around the clock face being detectable by said controller.

2. A device according to claim 1, further comprising a rotatable minute-hand cam whose angular position is indicative of the position of said minute hand on said clock face, and a rotatable hour-hand cam whose angular position is indicative of the position of said hour hand on said clock face, said controller being adapted to detect angular positions of both said minute-hand and hour-hand cams as each rotates, wherein the positions of said minute and hour hands on the clock face are detectable by said controller through detection of the angular positions of the minute-hand and hour-hand cams, respectively.

3. A device according to claim 2, said controller being adapted to detect electrical signals via respective first and second pluralities of indicator switches that are provided in conjunction and cooperate with said minute-hand cam and said hour-hand cam, respectively, such that each said plurality of indicator switches are actuated in different combinations based on different angular positions of the respective cam as it rotates.

4. A device according to claim 3, said minute-hand cam comprising a first plurality of arcuate lobes projecting from a minute switching surface thereof, said first plurality of arcuate lobes each extending along a circular arc and together defining a first plurality of orbital paths that are concentric with the axis of rotation of said minute-hand cam, said first plurality of indicator switches being disposed adjacent said minute switching surface such that at least one indicator switch is aligned in each of said first plurality of orbital paths so that it is activated when contacted by a lobe in the respective orbital path as said minute-hand cam rotates.

5. A device according to claim 4, said hour-hand cam comprising a second plurality of arcuate lobes projecting from an hour switching surface thereof, said second plurality of arcuate lobes each extending along a circular arc and together defining a second plurality of orbital paths that are concentric with the axis of rotation of said hour-hand cam, said second plurality of indicator switches being disposed adjacent said hour switching surface such that at least one indicator switch is aligned in each of said second plurality of orbital paths so that it is activated when contacted by a lobe in the respective orbital path as said hour-hand cam rotates.

6. A device according to claim 2, said minute-hand cam being operatively linked to said minute hand such that said minute-hand cam and said minute hand rotate according to a fixed cam-to-hand ratio.

7. A device according to claim 6, said cam-to-hand ratio being a 1:1 ratio, said minute-hand cam and said minute hand both being rotatable about the same axis of rotation.

8. A device according to claim 6, said minute-hand cam comprising a circumferentially disposed and radially extending tooth, said hour-hand cam comprising a series of circumferentially disposed receiver slots spaced at regular intervals, said minute-hand cam and hour-hand cam cooperating so that for each complete revolution of said minute-hand cam said tooth engages a successive one of said receiver slots and thereby advances said hour-hand cam a predetermined angular distance that is indicative of a corresponding angular distance traveled by said hour hand on said clock face.

9. A device according to claim 7, said minute-hand cam comprising a circumferentially disposed and radially extending tooth, said hour-hand cam comprising a series of circumferentially disposed receiver slots spaced at regular intervals, said minute-hand cam and hour-hand cam cooperating so that for each complete revolution of said minute-hand cam said tooth engages a successive one of said receiver slots and thereby advances said hour-hand cam a predetermined angular distance that is indicative of the angular distance traveled by said hour hand between successive hour numerals on said clock face.

10. A device according to claim 9, said predetermined angular distance being about 30°.

11. A device according to claim 8, further comprising an hour detent member effective to retain said hour-hand cam in discrete angular positions between successive advancements thereof on each complete revolution of said minute-hand cam.

12. A device according to claim 2, said controller comprising a microprocessor that is adapted to receive signals that indicate the angular positions of the respective minute-hand cam and hour-hand cam, and to monitor the angular positions of those cams while operating said motor in order to determine when to stop the motor, and thereby the minute and hour hands, to indicate a predetermined time on the clock face.

13. A device according to claim 3, said controller comprising a microprocessor that is adapted to receive signals via said first and second pluralities of indicator switches to determine the angular positions of the respective minute-hand cam and hour-hand cam, and to monitor the angular positions of those cams while operating said motor in order to determine when to stop the motor, and thereby the minute and hour hands, to indicate a predetermined time on the clock face.

14. A device according to claim 3, further comprising a normally open minute interval switch in a circuit pathway between said first plurality of indicator switches, which are provided in conjunction with said minute-hand cam, and said microprocessor, said minute interval switch being operable so that said minute interval switch is closed only at selected regular intervals of rotation of said minute-hand cam, said microprocessor therefore being able to detect signals from said first plurality of indicator switches only at said selected regular intervals of rotation of said minute-hand cam.

15. A device according to claim 14, further comprising a minute detent member having a detent engagement portion and a switch actuator portion, said minute-hand cam further comprising a detent receiver portion having a series of circumferentially disposed and regularly spaced detent notches, said minute detent member being arranged and biased so that on rotation of the minute-hand cam said engagement portion is caused to successively engage in said detent notches at the intervals where said detent notches are provided, said minute detent member and said minute interval switch being further arranged so that when the engagement portion of said minute detent member is engaged in a detent notch, said switch actuator portion is caused to operate, and thereby close, said minute interval switch.

16. A device according to claim 14, said selected regular intervals of rotation of said minute-hand cam corresponding to five-minute increments of movement of said minute hand around said clock face.

17. A device according to claim 1, said controller comprising a microprocessor that is programmed with a plurality of user-selectable modes and a plurality of user-selectable skill levels, wherein different modes correspond to different games the microprocessor will facilitate or play with a user of the device to teach said user about telling time, and wherein different skill levels correspond to questions or story problems about telling time of different degrees of difficulty for a said game.

18. A device according to claim 1, said controller comprising a microprocessor that is programmed:
   a) to request a user of said device, through an instruction, a story problem or otherwise, to set a particular time via manual movement of said hands,
   b) to accept an input from said user indicating the user has set the hands in response to the request, and
   c) to operate said motor to move said hands to the requested time if the user has set the hands to a different time.

19. A device according to claim 12, said microprocessor being programmed:
   a) to request a user of said device, through an instruction, a story problem or otherwise, to set a particular time via manual movement of said hands,
   b) to accept an input from said user indicating the user has set the hands in response to the request, and
   c) to operate said motor to move said hands to the requested time if the user has set the hands to a different time.

20. A device according to claim 1, further comprising an electronic braking circuit effective to stop the motor's rotation, and consequently that of the minute and hour hands, based on a signal from said controller when the hands reach a precise position on the clock face.

\* \* \* \* \*